United States Patent [19]

Kisaragi et al.

[11] Patent Number: 5,030,258
[45] Date of Patent: Jul. 9, 1991

[54] MIST RECOVERY APPARATUS

[75] Inventors: Takayasu Kisaragi, Tokyo; Kinzo Satomi, Shiga, both of Japan

[73] Assignee: Sumitomo Light Metal Industries, Ltd., Tokyo, Japan

[21] Appl. No.: 540,184

[22] Filed: Jun. 19, 1990

[30] Foreign Application Priority Data

Jun. 20, 1989 [JP] Japan ............................ 1-71230[U]
Sep. 21, 1989 [JP] Japan ........................... 1-109675[U]

[51] Int. Cl.$^5$ .............................................. B01D 45/12
[52] U.S. Cl. ....................................... 55/269; 55/348
[58] Field of Search ................. 55/269, 257.4, 257.7, 55/348, 456

[56] References Cited

U.S. PATENT DOCUMENTS 4,280,825  7/1981  Marjollet et al. ..................... 55/348

FOREIGN PATENT DOCUMENTS 582926  5/1931  Fed. Rep. of Germany ........ 55/238

Primary Examiner—Bernard Nozick
Attorney, Agent, or Firm—Flynn, Thiel, Boutell & Tanis

[57] ABSTRACT

A mist recovery apparatus is provided, which comprises a casing, an upper pipe plate and a lower pipe plate, a number of exhaust passing pipes each having a twisted plate therein, apertures formed at the side part of the casing to permit a cooling air flow to pass through the casing along the direction perpendicular to the exhaust passing pipes, a fume supply duct connected to the upper portion of the casing, and an exhaust duct disposed upwardly from the lower portion of the casing to the side of the casing so as to pass the exhaust from the exhaust passing pipes along the side of the casing and discharge the exhaust out of the casing. In such a structure, the mist contained in the exhaust produced from, for example, a rolling mill can be effectively separated and recovered and evolution of white smoke or fumes is greatly reduced. In order to achieve a more sufficient mixing of the exhaust and the air, a vertical chamber may be provided onto the discharge duct.

2 Claims, 4 Drawing Sheets

MIST RECOVERY APPARATUS

BACKGROUND OF THE INVENTION

1. Field of the Invention

The present invention relates to an apparatus for recovering mist from exhaust fumes containing mists of water, oil (e.g., kerosine) and the like, and, in particular, to a separation and recovery apparatus of mist parts contained in the exhaust fumes exhausted from, for example, a metal plate rolling mill.

2. Description of the Prior Art

The fumy mist (emulsion of water and oil) produced from a rolling mill whitens and is diffuses when it is discharged into the atmosphere. Because the fumy mist has a bad-smelling or offensive odor and pollutes the air, the fumy mist has been treated to remove the mist.

Filtration installations provided with a filter for removing the mist have been employed as mist removal devices. However, the filter is apt to be choked up or clogged with the mist after a short period, resulting in a high maintenance cost. In consequence, the conventional filtration installations are hardly used in the industrial field.

SUMMARY OF THE INVENTION

Accordingly, it is the purpose of the present invention to provide an apparatus for effectively separating and recovering mists contained in exhausts and recovering the saturated steam through liquefying and cooling, at a low maintenance cost, in which evolution of whitened fumes is effectively prevented.

According to one of the preferred embodiment of the present invention for solving the problem or shortcoming as set forth above, a mist recovery apparatus is provided, which comprises a casing, an upper pipe plate and a lower pipe plate, a number of exhaust passing pipes each having a twisted plate therein, apertures formed at the side part of the casing to permit a cooling air flow to pass through the casing along the direction perpendicular to the exhaust passing pipes, a fume supply duct connected to the upper portion of the casing, and an exhaust duct disposed upwardly from the lower portion of the casing to the side portion of the casing so as to flow the exhaust from the exhaust passing pipes along the side of the casing and discharge the exhaust out of the casing.

According to another preferred embodiment of the present invention, a mist recovery apparatus is provided, which apparatus comprises a casing, an upper pipe plate and a lower pipe plate, a number of exhaust passing pipes each having a twisted plate therein, apertures formed at the side part of the casing to permit a cooling air flow to pass through the casing along the direction perpendicular to that of the exhaust passing pipes, a fume supply duct connected to the upper portion of the casing, an exhaust duct disposed upwardly from the lower portion to the side portion of the casing and being so designed that the cooling air flow is sucked by the exhaust flow rising from the exhaust passing pipes along the side of the casing and mixed with the exhaust flow, and a vertical chamber connected to the exhaust duct.

DETAILED DESCRIPTION OF THE PREFERRED EMBODIMENTS

Figure 1:
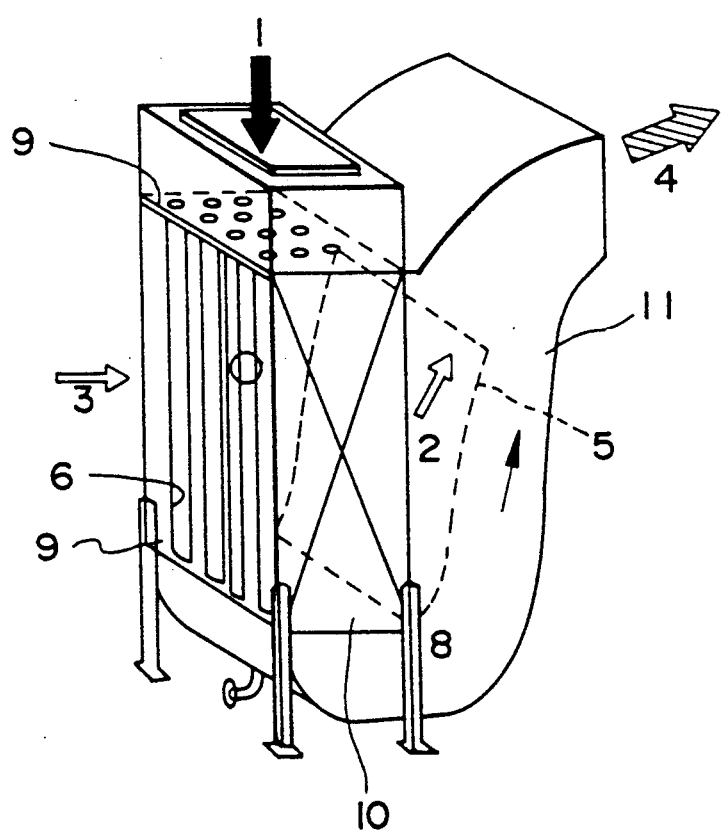
FIG. 1 is a partly broken perspective view of the mist recovery apparatus according to an embodiment of the present invention.
Figure 2:
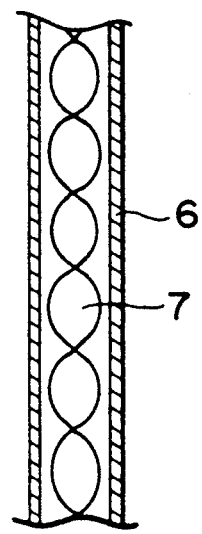
FIG. 2 is an enlarged sectional view of the part circled in the exhaust passing pipes of the apparatus shown in FIG. 1.

The preferred embodiments of the mist recovery apparatus according to the present invention will be described with reference to the accompanying drawings. As shown in FIG. 1, depicting a perspective view of the fist embodiment of the mist recovery apparatus according to the present invention, a casing 10 of the apparatus has upper and lower pipe plates 9 and a number of exhaust passing pipes 6, made of copper or copper alloy, arranged between the upper and the lower pipe plates 9. Within the interior of each exhaust passing pipe 6, a twisted plate 7 made of metal, such as stainless steel or an aluminum alloy, and having an outer diameter smaller little than the inner diameter of the exhaust passing pipe 6 is provided, as shown in FIG. 2. Upper and lower ends of the exhaust passing pipes 6 extend through the upper and lower pipe plates 9 and are open. Through the exhaust passing pipes 6, an exhaust containing mist passes. These exhaust passing pipes 6 are arranged in a row and cooling air flows around the outer walls of the respective exhaust passing pipes 6 along the direction substantially perpendicular to a direction of the exhaust passing pipes 6 in order to cool the interior of the exhaust passing pipes 6 through their outer walls. A discharge duct 11 provided with a discharge outlet 4 is disposed at the bottom portion of one side of the casing 10.

Flowing streams of the exhaust containing mist and the cooling air will be made apparent with reference to FIG. 1. The exhaust containing mist of water and oil from a rolling mill, or the like is supplied to the mist recovery apparatus through a duct connected to the top portion of the casing 10. In detail, the exhaust is fed to the casing 10 of the apparatus through the fumy exhaust inlet 1. Then, the exhaust flows into the exhaust passing pipes 6, which are open at the upper pipe plate 9, contacts with the inner wall of the pipe 6 and the twisted plate 7 placed in the exhaust passing pipe 6 and is cooled thereby. Consequently, the mist contained in the exhaust is separated on the interior of respective exhaust passing pipes 6 and the surface of the twisted plate 7. The exhaust is passed out of the exhaust passing pipes 6; which are open at the lower pipe plate 9, passes through the fume discharge outlet 8 formed at the lowest portion of the discharge duct 11, and rises along the side wall of the casing 10. There is a guide vane 5 in the interior of the discharge duct 11, so that the flow speed of the rising exhaust increases and the exhaust acts as an ejector at the end portion of the guide vane 5. In the interior space at the top end of the guide vane 5, the rising exhaust sucks the cooling air flow passing through the casing 10, mixes with the cooling air and discharges into the air through the discharge outlet 4 formed at the upper portion of the duct 11.

Due to the exhaust flow rising along the side of the casing 10, a suction effect or siphon phenomenon is generated, so that the cooling air is sucked from a cooling air inlet side 3 into the casing 10 and passes between the exhaust passing pipes 6, thereby cooling the exhaust passing pipes 6 through their outside walls. The cooling air is discharged from a cooling air outlet side 2, opposite to the cooing air inlet side 3, and is mixed with the exhaust discharged from the fume discharge outlet 8, at the end portion of the guide vane 5. The mixture is discharged out of the discharge outlet 4 to the atmosphere.

Figure 3:
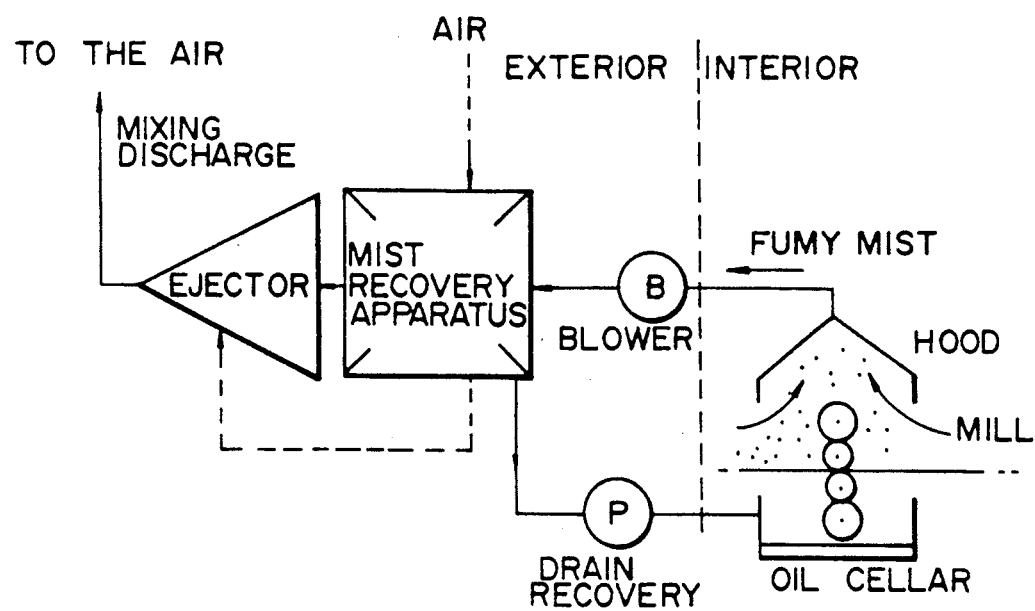
FIG. 3 is an exhaust flow chart of a system including the mist recovery apparatus shown in FIG. 1.

FIG. 3 is a flow chart including the mist recovery apparatus of the present invention. When fumy mist is generated from a rolling installation (mill) and floats upward, it is sucked by a blower B through a hood and supplied to the mist recovery apparatus according to the present invention. After the mist contained in the exhaust fume is separated in the mist recovery apparatus, the remaining exhaust is mixed with cooling air by its ejection function (i.e, suction mixing function), and discharged to the atmosphere. The separated mist is drained through a pump P to an oil cellar positioned under the hood, as shown in FIG. 3, and reused.

Since the exhaust is mixed with flowing-out air, which is warmed-up by heat exchange between it and the hot exhaust, the mixture is unsaturated with respect to water or steam, resulting in a considerable reduction of the white smoke to be discharged from the discharge outlet 4.

Figure 4:
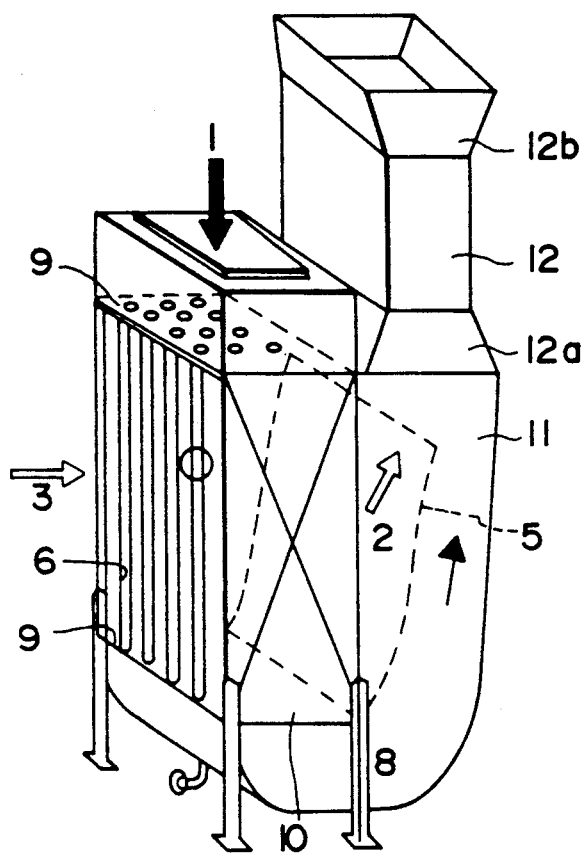
FIG. 4 is a view similar to that of FIG. 1, however according to another embodiment of the mist recovery apparatus.
Figure 5:
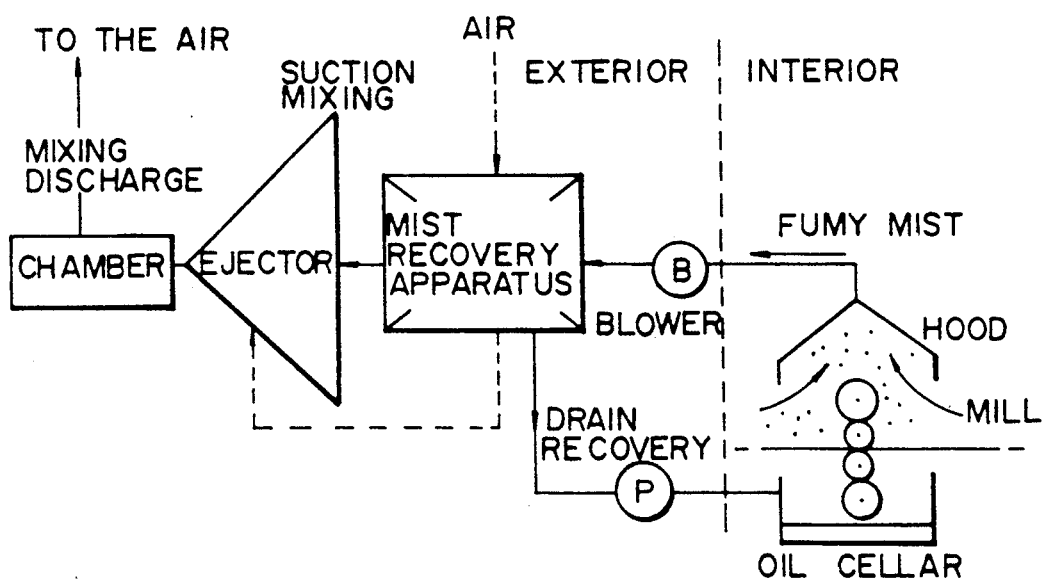
FIG. 5 is an exhaust flow chart of a system including the mist recovering apparatus shown in FIG. 4.

According to another preferred embodiment of the mist recovery apparatus, a chamber 12 is provided on the discharge duct 11 which is disposed upwardly from the lower portion to the side portion of the casing 10, as shown in FIG. 4. As described above, the discharge duct 11 has the guide vane 5 extending upwardly from the fume discharge outlet 8 to the discharge duct 11. A cooling air flow is sucked by the exhaust flowing along the guide vane 5 and mixed with the exhaust. The chamber 12 has a lower bell mouth 12a and an upper bell mouth 12b.

Due to the provision of the chamber 12, the exhaust and cooling air are further mixed and then discharged to the atmosphere.

Figure 6A:
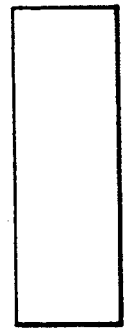
FIGS. 6 (a) to 6 (c) show various modifications of the chamber.
Figure 6B:
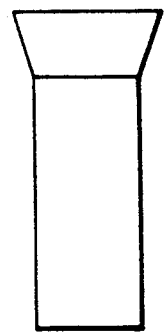
Figure 6C:
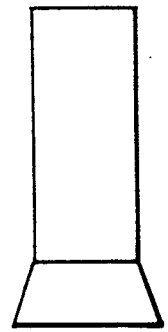

It is possible to change the shape of the chamber 12, as shown by FIG. 6(a), FIG. 6(b) and FIG. 6(c). The chamber 12, having the shape as shown in FIG. 4 and appropriate dimensions, is most effective, because, at the inlet part (lower bell mouth 12a) of the chamber 12, the blended exhaust fume converges to the center of the chamber 12 so as to permit a more intimate mixing and, at the outlet of the chamber 12 (the upper bell mouth 12b), the discharging fume is diffused.

As described above, the mist recovery apparatus of the present invention provides the following effects.

(1) The scattering of offensive and ill-smelling white smoke and mist is reduced or prevented.
(2) Mist with a particle size of 10 $\mu$m or more is sufficiently recovered.
(3) A recovery efficiency of at least 95% is attained, even when the particles size distribution of the mist is less than 150 $\mu$m.
(4) Rolling oil used in a rolling mill can be reused after being recovered.

What is claimed is:

1. A mist recovery apparatus comprising a casing, a set of an upper pipe plate and a lower pipe plate, a plurality of exhaust passing pipes each having a twisted plate therein, apertures formed at sides of said casing to permit a cooling air flow to pass through said casing along the direction perpendicular to that of said exhaust passing pipes, a fume supply duct connected to the upper portion of said casing, and an exhaust duct disposed upwardly from the lower portion to a side of said casing so as to flow an exhaust flow rising from said exhaust passing pipes along said side of the said casing and discharge said exhaust out of said casing.

2. A mist recovery apparatus as claimed in claim 1, in which a vertical chamber is connected to the top end of said exhaust duct.

* * * * *